(12) United States Patent
Teusch (10) Patent No.: US 11,865,628 B2
(45) Date of Patent: Jan. 9, 2024

(54) ROUGHENING TOOL AND METHOD FOR ROUGHENING A CYLINDRICAL SURFACE

(71) Applicant: GUEHRING KG, Albstadt (DE)

(72) Inventor: Bruno Teusch, Esslingen (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/287,080

(22) Filed: Feb. 27, 2019

(65) Prior Publication Data

US 2019/0210119 A1 Jul. 11, 2019

Related U.S. Application Data

(63) Continuation of application No. PCT/DE2017/000278, filed on Aug. 30, 2017.

(30) Foreign Application Priority Data

Aug. 31, 2016 (DE) .......................... 102016216464.3

(51) Int. Cl.
*B23C 3/34* (2006.01)

(52) U.S. Cl.
CPC .......... *B23C 3/34* (2013.01); *B23C 2210/244* (2013.01); *B23C 2215/242* (2013.01); *B23C 2220/36* (2013.01); *B23C 2220/60* (2013.01)

(58) Field of Classification Search
CPC ....... B23C 3/34; B23C 5/12; B23C 2210/244; B23C 2210/242; B23C 2210/325;
(Continued)

(56) References Cited

U.S. PATENT DOCUMENTS 1,202,195 A * 10/1916 Lees ........................ B23G 5/18
407/24
1,428,308 A 9/1922 Wiard
(Continued)

FOREIGN PATENT DOCUMENTS

DE 102007030876 A1 * 1/2009 ........... B23C 5/2413
DE 102008015582 9/2009
(Continued)

OTHER PUBLICATIONS

Description DE102008015582A1 (translation) obtained at https://worldwide.espacenet.com/ (last visited Sep. 4, 2020).*
(Continued)

*Primary Examiner* — Ryan Rufo
(74) *Attorney, Agent, or Firm* — Brown & Brown IP Law PLLC (57) ABSTRACT

A roughening tool for roughening the cylindrical surface of a bore in a particular metallic workpiece, e.g. the piston running surface of a cylinder bore or cylinder liner in an internal combustion engine, by generating a defined microstructure of a plurality of circumferentially spaced apart circumferential microgrooves. The roughening tool has a tool main body which can be driven in rotation about an axis of rotation and a multiplicity of circumferentially cutting cutting tools arranged at a defined axial distance from one another on the tool main body. According to the invention, the cutting tools are each formed from a disc milling cutter and each disc milling cutter has at least one cutting element with a multiplicity of cutting teeth arranged at an axial distance from one another. In addition, a method for roughening a cylindrical surface.

20 Claims, 5 Drawing Sheets

(58) Field of Classification Search
CPC ........ B23C 2210/323; B23C 2215/242; B23C 2200/206; B23C 2200/205; B23C 2220/363; B23C 2220/36; B23C 2220/52; B23B 2220/123; B23B 2220/126; B23B 27/08; B23B 27/083; Y10T 407/172; Y10T 407/1902
See application file for complete search history.

(56) References Cited

U.S. PATENT DOCUMENTS

| | | | | |
|---|---|---|---|---|
| 1,432,580 | A * | 10/1922 | Vauclain | B23C 5/006 407/31 |
| 1,465,240 | A | 8/1923 | Schurr | |
| 1,855,511 | A * | 4/1932 | Edgar | B23F 21/166 407/59 |
| 2,212,753 | A * | 8/1940 | Flater | F16K 31/34 408/217 |
| 2,369,273 | A * | 2/1945 | Bakewell | B23G 5/062 408/222 |
| 2,400,187 | A * | 5/1946 | Bakewell | B23G 1/32 407/31 |
| 2,408,565 | A * | 10/1946 | Lieblein | B23G 5/06 408/233 |
| 2,424,473 | A * | 7/1947 | Luers | B23B 27/22 407/116 |
| 2,429,822 | A * | 10/1947 | Kelly | C14B 1/48 69/6.5 |
| 2,431,581 | A * | 11/1947 | Owen | B23C 5/006 407/56 |
| 2,658,261 | A * | 11/1953 | Junker | B23C 5/04 407/31 |
| 2,810,189 | A * | 10/1957 | See | B23C 5/2265 407/50 |
| 3,577,809 | A * | 5/1971 | Brandl | B23B 29/03421 408/186 |
| 3,986,543 | A * | 10/1976 | Slayton | B27G 13/12 144/237 |
| 4,219,291 | A * | 8/1980 | Hoeh | B02C 18/182 407/31 |
| 4,242,020 | A * | 12/1980 | Schmid | B23C 5/08 409/234 |
| 4,674,923 | A * | 6/1987 | Ogilvie | B23C 5/2213 144/237 |
| 5,201,353 | A * | 4/1993 | Weill | B23C 5/00 144/208.4 |
| 7,954,523 | B2 * | 6/2011 | Liu | B27G 13/005 144/233 |
| 7,993,082 | B2 * | 8/2011 | Horiike | B23C 5/202 407/42 |
| 9,272,341 | B2 | 3/2016 | Nedzlek et al. | |
| 9,511,467 | B2 | 12/2016 | Whitbeck et al. | |
| 10,220,453 | B2 * | 3/2019 | Stephenson | B23C 5/2406 |
| 2006/0236839 | A1 | 10/2006 | Munch et al. | |
| 2007/0098506 | A1 * | 5/2007 | Flynn | B23C 5/10 407/53 |
| 2008/0044239 | A1 * | 2/2008 | Sjoo | B23C 5/2493 407/36 |
| 2008/0260476 | A1 * | 10/2008 | Ishida | B23C 5/06 407/35 |
| 2010/0031799 | A1 * | 2/2010 | Ast | B23C 5/207 83/875 |
| 2010/0135740 | A1 * | 6/2010 | Harif | B23B 1/00 408/1 R |
| 2011/0170963 | A1 * | 7/2011 | Smilovici | B23C 5/20 407/42 |
| 2012/0321397 | A1 * | 12/2012 | Sjoo | B23C 5/04 407/29 |
| 2013/0022414 | A1 * | 1/2013 | Athad | B23C 5/006 29/592 |
| 2014/0050544 | A1 | 2/2014 | Nedzlek et al. | |
| 2014/0360355 | A1 | 12/2014 | Whitbeck et al. | |
| 2014/0364042 | A1 * | 12/2014 | Whitbeck | B24B 5/08 451/51 |
| 2016/0169149 | A1 | 6/2016 | Hahn et al. | |
| 2017/0045013 | A1 | 2/2017 | Whitbeck et al. | |
| 2017/0120350 | A1 * | 5/2017 | Stephenson | B23C 5/109 |
| 2017/0334002 | A1 * | 11/2017 | DiMartino | B23C 5/14 |
| 2018/0133812 | A1 * | 5/2018 | Osawa | B23C 5/26 |
| 2019/0242076 | A1 * | 8/2019 | Latham | B02C 13/28 |

FOREIGN PATENT DOCUMENTS

| | | | | |
|---|---|---|---|---|
| DE | 102008015582 A1 * | 9/2009 | | B23C 5/109 |
| DE | 102010014689 | 10/2011 | | |
| DE | 102011055210 | 5/2013 | | |
| DE | 102011055210 A1 * | 5/2013 | | B23G 5/18 |
| DE | 102013108604 | 2/2014 | | |
| DE | 102014210636 | 12/2014 | | |
| DE | 102013011726 | 1/2015 | | |
| EP | 0610978 A1 * | 8/1994 | | B23C 5/006 |
| FR | 1243771 A * | 10/1960 | | |
| FR | 2746044 A1 * | 9/1997 | | B23C 5/006 |
| GB | 129138 A * | 7/1919 | | B23C 5/20 |

OTHER PUBLICATIONS

Description DE102011055210A1 (translation) obtained at https://worldwide.espacenet.com/ (last visited Dec. 7, 2022).*
International Search Report and Written Opinion of the ISA from corresponding international patent application (IA Appln. No. PCT/DE2017/000278) dated Feb. 15, 2018, 14 pages.
DPMA Register, DE File Number : 10 2016 216 464.3, printed Feb. 27, 2019, 2 pages.

* cited by examiner

ROUGHENING TOOL AND METHOD FOR ROUGHENING A CYLINDRICAL SURFACE

The invention relates to a roughening tool and a method for roughening a cylindrical surface of a bore in a particularly metallic workpiece, for example the piston bearing surface of a cylinder bore or a cylinder liner in an internal combustion engine, by producing a defined microstructure that is composed of a plurality of microgrooves extending circumferentially at an axial distance from one another.

It is well known that surfaces of bores in metallic workpieces, which are subjected to high tribological stresses, for example the piston bearing surfaces of cylinder bores or cylinder liners in an internal combustion engine, are mechanically roughened with the aid of non-cutting or cutting tools in order to achieve a sound adhesive base for a surface layer to be applied, particularly by means of thermal spraying.

For example, DE 10 2013 011 726 A1 proposes a roughening tool that comprises a plurality (e.g. 5 to 100) of circumferentially cutting cutting tools in the form of saw blades, which are arranged at an axial distance from one another and fastened on a tool base body. In order to produce a first plurality of circumferential grooves in the wall of a cylinder bore in an internal combustion engine, the roughening tool rotating about its longitudinal center axis is initially introduced into the bore along the bore axis and then moved radially outward in the direction of the cylindrical surface until the saw blades cut into the cylindrical surface to a desired depth. Subsequently, the rotating cutting tool is moved along a 360° orbit about the bore axis such that a number of circumferentially extending grooves, which corresponds to the number of saw blades, is simultaneously cut into the cylindrical surface. Since the number of saw blades is smaller than the required number of grooves to be produced in the cylindrical surface, the roughening tool initially has to be retracted radially inward, subsequently displaced along the bore axis by a desired dimension and then once again moved radially outward and along a 360° orbit about the bore axis such that a second plurality of grooves is produced in the cylindrical surface. This process has to be repeated until the required number of grooves has been produced.

In the roughening tool proposed in DE 10 2013 011 726 A1, each saw blade can only produce one circumferential groove in the cylindrical surface to be machined during a 360° circular motion. Multiple machining cycles, which respectively comprise an axial motion, a radially outward motion, a 360° circular motion and a radially inward motion of the roughening tool, are required in order to produce a microstructure that is composed of a predefined number of circumferential grooves (which is greater than the number of saw blades) in a cylindrical surface of predefined length with the method proposed in DE 10 2013 011 726 A1. However, the execution of multiple machining cycles of this type is time-consuming and requires an elaborate control of the roughening tool in order to realize the production of defined microgroove structures with reproducible accuracy.

Alternatively, it would be conceivable to equip the roughening tool with a number of saw blades, which corresponds to the number of microgrooves to be produced in the cylindrical surface to be machined, such that the cylindrical surface can be machined in only one machining cycle. In the roughening tool proposed in DE 10 2013 011 726 A1, the cutting width and the cross-sectional profile of the cutting teeth of each saw blade respectively correspond to the groove width or the groove cross section of the groove being produced. Since conventional groove widths for the roughening process lie in the micrometer range, e.g. between 100 µm and 200 µm, the cutting teeth of the saw blades must have a correspondingly filigree cutting profile. Furthermore, the saw blades have to be spaced apart from one another by a distance that corresponds to the web width between the grooves. Since conventional web widths likewise lie in the micrometer range, e.g. at 100 µm, the roughening tool therefore would have to be equipped with a plurality of filigree saw blades in order to realize the machining of a cylindrical surface over its entire length in one machining cycle. However, the risk of vibrations is very high in such filigree saw blades due to the cutting forces occurring on the cutting teeth during the machining of the workpiece. This is not only disadvantageous with respect to the service life of the saw blades or the roughening tool, but also calls into question the reproducibility of the accuracy of a defined microstructure.

In addition, the composition or the assembly of a roughening tool with a large number of filigree saw blades is time-consuming and demanding in order to prevent damages to the saw blades during the assembly and to arrange the saw blades on the tool base body in such a way that assembly errors, which could jeopardize the machining accuracy, are prevented.

Based on DE 10 2013 011 726 A1 the invention therefore aims to develop a roughening tool for roughening a cylindrical surface of a bore in a particularly metallic workpiece, for example the piston bearing surface of a cylinder bore or a cylinder liner in an internal combustion engine, by producing a defined microstructure that is composed of a plurality of microgrooves extending circumferentially at a defined axial distance from one another, wherein said roughening tool is characterized by a high vibrational rigidity and stability, as well as by a high ease of assembly and productivity.

This objective is attained by means of a roughening tool with the characteristics of claim 1. Advantageous enhancements and embodiments form the objects of the dependent claims.

An inventive roughening tool comprises a tool base body, which can be driven so as to rotate about a longitudinal center axis or rotational axis, and a plurality of circumferentially cutting cutting tools with the same nominal diameter, which are arranged on the tool base body at a defined axial distance from one another. As in the prior art, the nominal diameter of the cutting tools or the roughening tool is smaller than the bore diameter of the cylindrical surface to be machined. However, the circumferentially cutting cutting tools of the inventive roughening tool are in contrast to the initially discussed prior art respectively formed by a side milling cutter that comprises at least one circumferentially cutting cutting element with a plurality of cutting teeth that are arranged at an axial distance from one another. To this end, each side milling cutter may conventionally comprise a central recess for accommodating a pin-like receptacle section of the tool base body that carries the side milling cutters. Each cutting element particularly has a filigree toothing that corresponds to the profile of the microstructure to be produced and is composed of a plurality of individual cutting teeth that are arranged at an axial distance from one another. Consequently, each side milling cutter can simultaneously cut a number of circularly extending microgrooves, which corresponds to the number of cutting teeth of the at least one cutting element, into the cylindrical surface in one machining cycle, i.e. during a 360° circular motion of the roughening tool. The cutting profile of each cutting element, which is defined by the cutting teeth, is adapted to the desired microstructure to be produced.

Each cutting element therefore has a cutting profile width that is far greater than the width of each saw blade of the roughening tool according to DE 10 2013 011 726 A1. Due to the greater cutting profile width of each cutting element, each side milling cutter and therefore the roughening tool as a whole can be realized with higher vibrational rigidity and stability.

Furthermore, the smaller number of side milling cutters makes the assembly of the roughening tool easier and more reliable with respect to its accuracy. All in all, a high reproducibility with respect to the accuracy of a microgroove structure, which corresponds to the cutting profile of the cutting elements, can thereby be ensured.

Each side milling cutter may be composed of multiple components, i.e. designed modularly, or realized in one piece, i.e. designed monolithically. In a modular design, each side milling cutter may be composed of a milling cutter base body with the aforementioned central recess and at least one cutting element held on the milling cutter base body. The at least one cutting element may be held on the milling cutter base body exchangeably, e.g. by means of clamping or screwing, or permanently, e.g. by means of soldering, bonding or the like. Each cutting element may be formed by a cutting plate, a cutting bar, a cutting insert or a comparable cutting body, e.g. of a PCD (polycrystalline diamond) material, and fastened on the milling cutter base body directly or indirectly, e.g. by means of a cartridge. The exchangeable fastening of the at least one cutting element on the milling cutter base body makes it possible to easily exchange the respective cutting element when it is worn out or when the roughening tool needs to be adapted to a desired microstructure. In contrast, the permanent fastening of the at least one cutting element on the milling cutter base body simplifies the assembly of the roughening tool. If the side milling cutters are realized monolithically, the cutting elements respectively form integral functional sections of the respective side milling cutter. A simple assembly of the roughening tool is also achieved in this case.

In order to achieve a consistent surface quality and therefore a consistent adhesive base for a subsequent coating over the entire machining length of the cylindrical surface, the cutting teeth of the at least one cutting element of each side milling cutter preferably are arranged at identical axial distances from one another, i.e. with the same axial pitch, and provided with identical tooth profiles. Identically designed cutting elements contribute to a simple manufacture of the side milling cutters such that the assembly of the roughening tool is simplified and the manufacturing costs are minimized.

In order to achieve a high productivity, each side milling cutter preferably comprises a plurality of cutting elements that are circumferentially spaced apart from one another by identical angular distances, i.e. with the same angular pitch. In a preferred embodiment, the side milling cutters are respectively realized with eight cutting elements, i.e. eight cutting elements are distributed over the circumference of each side milling cutter at identical angular distances from one another. In this case, the cutting teeth of each cutting element of a side milling cutter are advantageously arranged in alignment in the circumferential direction, i.e. the cutting teeth of the cutting elements of a side milling cutter are axially arranged identically or the cutting elements of a side milling cutter have identical cutting profiles, respectively. The arrangement of a plurality of identical cutting elements in the same axial position makes it possible to minimize the cutting force stresses on each cutting element, as well as the machining time for producing a defined microstructure in a cylindrical surface.

Furthermore, the cutting teeth of each cutting element, which are arranged at an axial distance from one another, may be axially arranged in a row, i.e. parallel to the rotational axis, such that each side milling cutter is effectively realized in a linearly grooved manner.

In a preferred embodiment, the cutting teeth respectively have a rectangular profile that is defined by a predetermined length and height, wherein the predetermined length may lie in the range between 200 and 400 µm and the predetermined height may lie in the range between 60 and 200 µm. The axial distance between two successively arranged teeth may lie in the range between 100 and 200 µm. However, the cutting teeth may, for example, also have round profiles, trapezoidal profiles and/or dovetail profiles or the like and combinations of these profiles instead of the rectangular profile or in addition to the rectangular profile. The cutting teeth may furthermore comprise or combine symmetric and/or symmetric cross-sectional profiles.

In a preferred embodiment, the plurality of side milling cutters advantageously are realized identically with respect to the number of cutting elements and the configuration of the cutting elements such that a microgroove structure, which is composed of a plurality of microgrooves of identical depth and length that extend circumferentially at identical axial distances from one another, can be produced in a cylindrical surface with the plurality of side milling cutters during a 360° circular motion of the roughening tool over a length corresponding to the length of the plurality of side milling cutters.

An additional side milling cutter may precede and/or an additional side milling cutter may follow the plurality of side milling cutters, wherein these additional side milling cutters differ from the plurality of side milling cutters with respect to the configuration of the cutting elements. For example, the preceding and/or following side milling cutter/s have a greater gap between two cutting teeth and therefore, for example, a wider cutting profile in order to respectively identify the beginning and the end of the microgroove structure to be produced.

The side milling cutters preferably are fastened on the tool base body exchangeably in order to allow a relatively flexible adaptation of the roughening tool to different machining conditions, particularly the microstructure to be produced, the length of the cylindrical surface to be machined or the like. To this end, the side milling cutters advantageously are positively and/or non-positively connected to the tool base body in the rotating direction and the axial direction.

The side milling cutters can be fastened on the tool base body in the rotating direction, i.e. for the torque transfer, in a technically simple and cost-efficient manner by means of a driving feature such as a feather key, which is arranged between the side milling cutters and the tool base body, analogous to a shaft-hub connection. In this case, all side milling cutters advantageously are fastened on the tool base body by means of a common driving feature. The use of a common driving feature allows a high torque transfer between the tool base body and the side milling cutters, simplifies the assembly of the roughening tool and makes it possible to easily adjust the distance between the side milling cutters due to the axial displaceability of the side milling cutters on the tool base body.

The driving feature may be accommodated on the side of the tool base body in a longitudinal groove that is open on the side of the outer circumference and arranged on a receptacle section of the tool base body, which carries the side milling cutters. On the side of the side milling cutters, each side milling cutter may comprise either one longitudinal groove or a plurality of longitudinal grooves, which respectively are open toward the inside of the inner circumference of the central recess, analogous to a splined hub. If each side milling cutter has just one longitudinal groove, the rotational position of each side milling cutter on the tool base body is clearly defined. If each side milling cutter has a plurality of longitudinal grooves that are spaced apart from one another by defined and advantageously identical angular distances, each side milling cutter can be fastened on the tool base body in a number of rotational positions that corresponds to the number of longitudinal grooves. This makes it possible to arrange the side milling cutters in such a way that the at least one cutting elements of the side milling cutters extend axially in a row or along a helical line or helix, respectively. All in all, the roughening tool can therefore be realized in a linearly grooved or helically grooved manner. The helical arrangement of the cutting elements makes it possible to reduce the machining forces and to achieve a high smoothness of running. A plurality of feather key grooves represents another option for fastening the side milling cutters on the tool base body in different rotational positions.

As an alternative to the above-discussed driving feature connection, the side milling cutters may be connected to the tool base body in a rotationally rigid manner analogous to a splined shaft/splined hub connection or a polygonal hub/polygonal shaft connection. The side milling cutters may therefore respectively comprise a central recess with a splined hub or internal polygonal profile whereas the tool base body has a splined shaft or external polygonal profile on the receptacle section carrying the side milling cutters. Such positive connections between the side milling cutters and the tool base body allow a flexible adaptation of the rotational positions of the side milling cutters on the tool base body in order to achieve an optimal extent of the respective cutting elements or circumferential cutting edges of the side milling cutters for the respective machining conditions. For example, the side milling cutters may be fastened on the tool base body in such a way that the at least one cutting elements of the side milling cutters extend axially in a row or along a helical line or helix, respectively. All in all, the roughening tool can therefore be realized in a linearly grooved or helically grooved manner.

Due to an axial displaceability of the side milling cutters on the tool base body, the above-discussed positive connections furthermore allow a simple adjustment of the distance between the side milling cutters.

The side milling cutters advantageously are non-positively fastened on the tool base body in the axial direction. This can be easily achieved in that the side milling cutters are clamped between an axial stop on the side of the tool base body and a clamping screw that is screwed into the end face of the tool base body, if applicable by means of spacers such as spacer sleeves or spacer rings arranged between the side milling cutters. The spacers make it possible to ideally adjust the distance between axially successive side milling cutters in such a way that the side milling cutters are arranged at identical distances from one another.

The distance between two axially successive side milling cutters particularly can be adjusted in such a way that the multi-toothed cutting profiles of the cutting elements of both side milling cutters overlap by a defined dimension viewed in the circumferential direction or cutting direction if the cutting profile widths of the cutting elements of the two side milling cutters are respectively greater than the widths of the milling cutter base bodies of the two side milling cutters. In other words, the microstructures produced by the cutting elements of the two side milling cutters overlap by the defined dimension. A consistent microstructure, in which all circumferential microgrooves are arranged at identical axial distances from one another, can thereby be produced in a cylindrical surface over a desired machining length.

In order to allow an overlap of the cutting profiles of two axially successive cutting elements, the two side milling cutters are advantageously rotated relative to one another in such a way that the cutting elements of the two side milling cutters are arranged behind one another viewed in the circumferential direction or cutting direction and cut into the cylindrical surface to be machined offset in time.

An inventive roughening tool may furthermore comprise a shank section that is connected to the tool base body and serves for connecting the roughening tool to a disconnection point or interface of the machine tool system. In this embodiment, the roughening tool forms an end milling cutter with a tool base body that can be functionally divided into the shank section and the aforementioned receptacle section, on which the side milling cutters are arranged.

In a preferred embodiment, the inventive roughening tool furthermore comprises an internal cooling lubricant supply system for supplying the cutting elements with cooling lubricant.

If the roughening tool comprises a plurality of cutting elements, which are arranged at an axial distance from one another and respectively comprise a plurality of cutting teeth that are arranged at an axial distance from one another, over an axial length that is greater than/equal to the length of the cylindrical surface to be machined, the cylindrical surface can be roughened by initially introducing the roughening tool, which is positioned outside the cylindrical surface to be machined, into the bore along the bore axis up to a desired depth; the rotating roughening tool is then moved radially outward until the cutting teeth cut into the cylindrical surface up to a desired depth; the roughening tool is subsequently circulated along a 360° orbit about the bore axis; the roughening tool is then once again moved back radially inward; the roughening tool is ultimately retracted from the bore again along the bore axis. In contrast to the initially discussed roughening tool, a cylindrical surface can therefore be roughened with the aid of the inventive roughening tool in one machining cycle.

A preferred embodiment of an inventive roughening tool is described below with reference to the attached drawings. In these drawings.

A preferred embodiment of an inventive roughening tool is described in greater detail below with reference to FIGS. 1 to 6. The roughening tool is realized in the form of a circular milling cutter and designed for mechanically roughening a cylindrical surface of a bore in a particularly metallic workpiece, for example the piston bearing surface of a cylinder bore or a cylinder liner in an internal combustion engine, by producing a defined microstructure, which is composed of a plurality of microgrooves extending circumferentially at an axial distance from one another, in the surface in order to achieve a sound adhesive base for a surface layer to be applied, particularly by means of thermal spraying.

For this purpose, the roughening tool 1 has the modular design illustrated in the figures, which comprises a tool base body 10, which can be driven so as to rotate about a longitudinal center axis or rotational axis 2, and a plurality of circumferentially cutting cutting tools 20 to 34, which are arranged on the tool base body at a defined axial distance from one another, wherein the embodiment shown particularly comprises 15 of these circumferentially cutting cutting tools.

The tool base body 10 can be functionally divided into a shank section 11 and a receptacle section 12. The roughening tool 1 can be connected to a disconnection point or interface of a (not-shown) machine tool system by means of the shank section 11. To this end, the shank section 11 in the embodiment shown comprises a hollow shank taper (HSK) that is familiar to a person skilled in the art. The base body 10 in the embodiment shown comprises a shank section 11 such that the roughening tool 1 forms an end milling cutter. The receptacle section 12 forms a pin-like extension of the base body 10 and carries the plurality of cutting tools 20 to 34. All cutting tools 20 to 34 have the same nominal diameter D, e.g. 70 mm, and form a cutting section 13 of the roughening tool 1. The nominal diameter D of the cutting section 13 of the roughening tool 1, which has a length L, e.g., of 154 mm, is smaller than the inside diameter of the (not-shown) cylindrical surface to be machined. In the embodiment shown, the roughening tool 1 therefore forms an end milling cutter with a tool base body 10 that can be functionally divided into the shaft section 11 and the receptacle section 12, on which the cutting tools 20 to 34 are arranged.

In the inventive roughening tool 1, the circumferentially cutting cutting tools 20 to 34 are respectively formed by a side milling cutter that is composed of multiple components in the embodiment shown. Each side milling cutter 20 to 34 particularly comprises a disk-shaped milling cutter base body 20a to 34a and a plurality of circumferentially cutting cutting elements 20b to 34b, wherein the embodiment shown particularly comprises eight of these circumferentially cutting cutting elements. Each milling cutter base body 20a to 34 has a central recess 20c to 34c, which accommodates the pin-like receptacle section 12 of the tool base body 10 with a defined clearance fit, and comprises on its outer circumference a number of receptacle pockets 20d to 34d that corresponds to the number of cutting elements, wherein said receptacle pockets are arranged at identical angular distances from one another, i.e. with the same angular pitch, in the cutting direction or circumferential direction of the respective side milling cutter 20 to 34 and respectively accommodate one of the cutting elements 20b to 34b.

Each cutting element 20b to 34b is made of a PCD (polycrystalline diamond) material and fastened on the respective milling cutter base body 20a to 34a in the corresponding receptacle pocket 20d to 34d by means of soldering. Each cutting element 20b to 34b particularly comprises a filigree toothing, which corresponds to the profile of the microgroove structure to be produced and is composed of a plurality of individual cutting teeth that are arranged at an axial distance from one another (in this context, see FIG. 4 to FIG. 7). The multi-toothed cutting profile of each cutting element 20b to 34b, which is defined by the cutting teeth, is adapted to the desired microstructure to be produced. In the embodiment shown, the cutting teeth of the cutting elements 21b to 33b of the second to fourteenth side milling cutters 21 to 33 are arranged at identical axial distances of about 170 μm from one another, i.e. with the same axial pitch, and provided with identical rectangular tooth profiles. Furthermore, the cutting teeth of the cutting elements 21b to 33b of the second to fourteenth side milling cutters 21 to 33 respectively have a length of about 280 μm and a height of about 147 μm in the embodiment shown. However, this cutting profile is not mandatory and therefore may vary.

Figure 1:
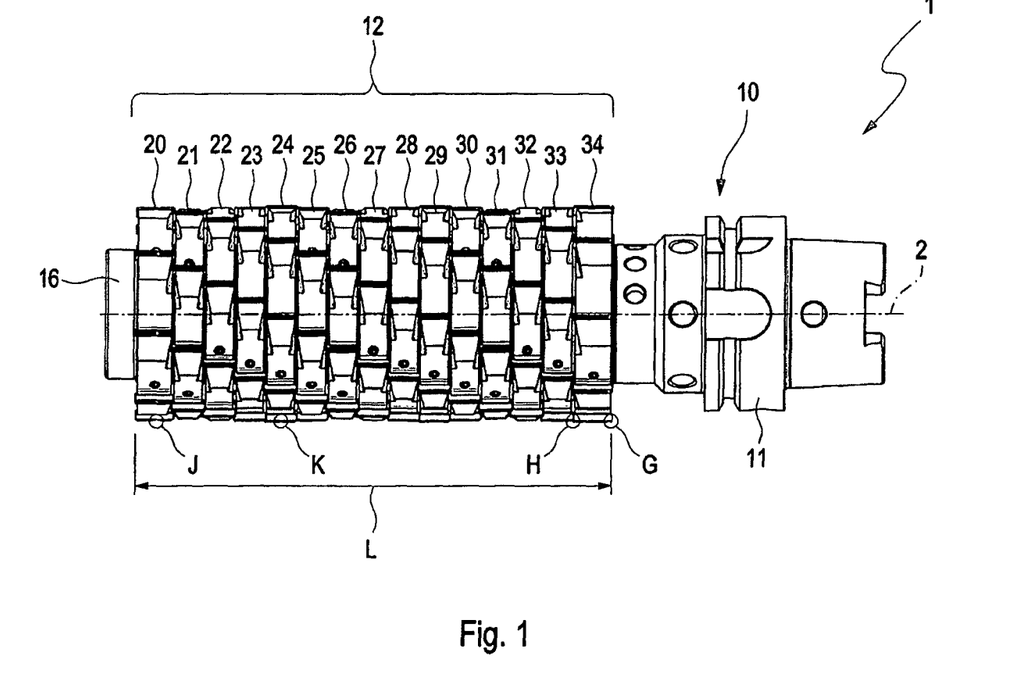
FIG. 1 shows a side view of an inventive roughening tool.
Figure 2:
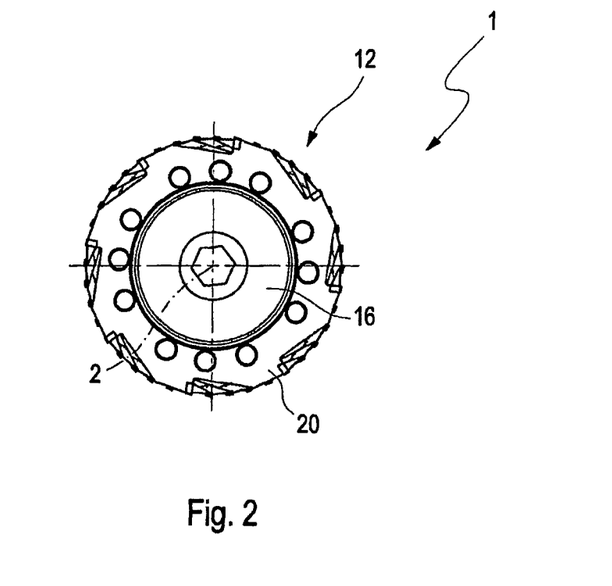
FIG. 2 shows a front view of the inventive roughening tool.
Figure 3:
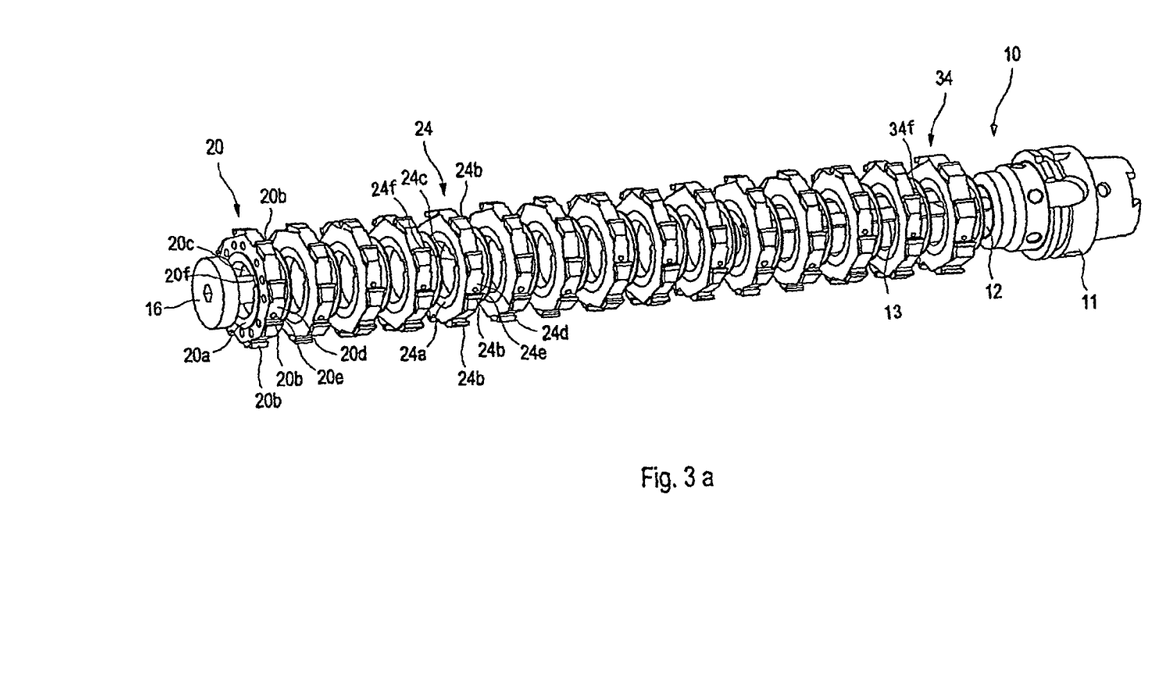
FIG. 3 shows a perspective exploded view of the inventive roughening tool.
Figure 4:
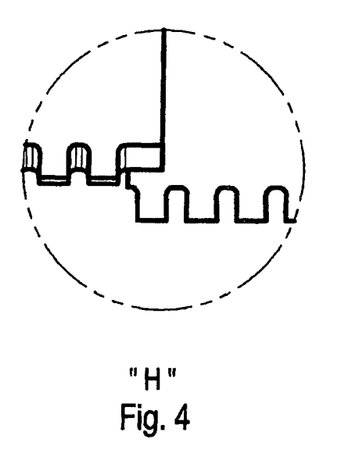
FIG. 4 shows the detail H encircled in FIG. 1 on a larger scale.
Figure 5:
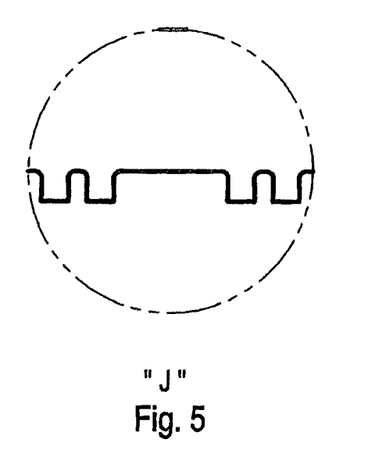
FIG. 5 shows the detail J encircled in FIG. 1 on a larger scale.
Figure 6:
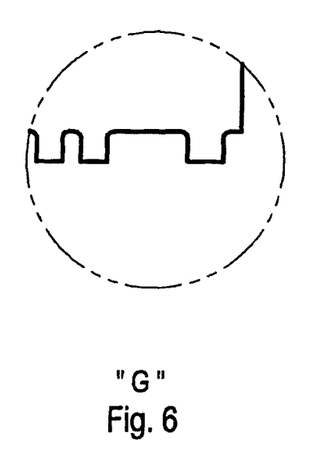
FIG. 6 shows the detail G encircled in FIG. 1 on a larger scale.
Figure 7:
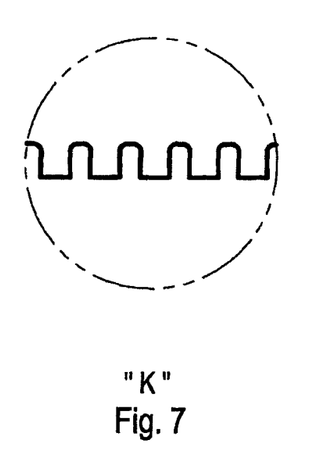
FIG. 7 shows the detail K encircled in FIG. 1 on a larger scale.
Figure 8:
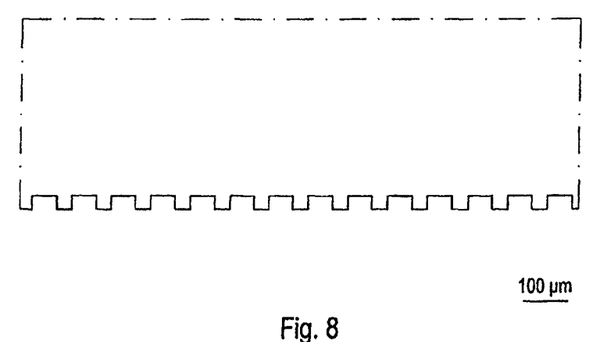
FIG. 8 shows the cutting profile of a microgroove structure produced in a cylindrical surface by means of the inventive roughening tool.

The second to fourteenth side milling cutters 21 to 33 therefore form a plurality of side milling cutters that are equipped with identical cutting elements and axially clamped between the first and fifteenth side milling cutters 20, 34. Leaving aside the fact that the cutting elements 20b, 34b of the first and fifteenth side milling cutters 20, 34 respectively have essentially in their center a larger tooth gap of about 1250 μm on the first side milling cutter 20 and about 900 μm on the fifteenth side milling cutter 34 (see FIG. 4 and FIG. 6), the cutting teeth of the cutting elements 20b, 34b of the first and fifteenth side milling cutter 20, 34 are also arranged at the same axial distances from one another, i.e. with the same axial pitch, and have the same rectangular tooth profile as the cutting teeth 21b to 33b of the second to fourteenth side milling cutters 21 to 23. Due to the larger tooth gaps, the first side milling cutter 20 and the fifteenth side milling cutter 34 respectively have a greater cutting profile width B20, B34 than the second to thirteenth side milling cutters as illustrated in FIGS. 1 and 3 (see, e.g., B24 in FIG. 1).

Furthermore, the cutting teeth of all cutting elements 20b to 34b, which are arranged at an axial distance from one another, are axially arranged in a row, i.e. parallel to the rotational axis 2. Consequently, each side milling cutter 20 to 34 is realized in a linearly grooved manner. The circumferentially successive cutting elements 20b to 34b of a side milling cutter have the same cutting profile. Furthermore, the cutting teeth of the cutting elements 20b to 34b of each side milling cutter 20 to 34 are arranged in alignment in the circumferential direction. Consequently, each side milling cutter 20 to 34 can cut a number of microgrooves that corresponds to the number of cutting teeth of each cutting element 20b to 34b, e.g. 21 microgrooves. FIGS. 1 and 3 furthermore show that the cutting profile width of each cutting element 20b to 34b is slightly larger than the (maximum) width of the disk-shaped milling cutter base body 20a to 34a of the respective side milling cutter 20 to 34. Consequently, each cutting element 20b to 34b axially protrudes over the disk-shaped milling cutter base body 20a to 34a of the respective side milling cutter 20 to 34 by a defined dimension.

The side milling cutters 20 to 34 are advantageously fastened on the tool base body 10 in an exchangeable manner. To this end, the side milling cutters 20 to 34 arranged on the receptacle section 12 of the tool base body 10 with a defined clearance fit respectively are positively and non-positively connected to the tool base body 10 in the rotating direction and the axial direction. The side milling cutters 20 to 34 are fastened on the tool base body in the rotating direction, i.e. for the torque transfer, by means of a driving feature in the form of a feather key 13, which is arranged between the side milling cutters 20 to 34 and the tool base body 10, analogous to a shaft-hub connection. In this case, all side milling cutters 20 to 34 advantageously are fastened on the tool base body 10 by means of a common feather key 13. According to FIG. 3b, the feather key 13 is on the side of the tool base body accommodated in a longitudinal groove 14 on the receptacle section 12 carrying the side milling cutters 20 to 34. On the side of the side milling cutters, each side milling cutter 20 to 34 in the embodiment shown has just one longitudinal groove 20f to 34f on the inner circumference of the central recess 20c to 34c. The rotational position of each side milling cutter 20 to 34 on the tool base body 10 is therefore clearly defined, particularly such that the side milling cutters 20 to 34 arranged on the tool base body 10 are rotated relative to one another in such a way that the cutting elements 20b to 34b of the side milling cutters 20 to 34 respectively extend along helical lines or helixes. The cutting elements 20b to 34b of two axially successive side milling cutters are therefore arranged behind one another viewed in the circumferential direction or cutting direction and cut into the cylindrical surface to be machined offset in time. All in all, the cutting section 13 of the roughening tool 1 is therefore realized in a helically grooved manner.

The side milling cutters 20 to 34 advantageously are non-positively fastened on the tool base body 10 in the axial direction. In the embodiment shown, this is achieved in that the side milling cutters 20 to 34 are clamped between an axial stop 15 on the side of the tool base body and a clamping screw 16 that is screwed into the end face of the tool base body 10 by means of spacers 35 to 49 in the form of spacer rings arranged between the side milling cutters. According to FIGS. 1, 3a and 3b, the clamping screw 16 is realized in the form of a head screw, the head 17 of which presses against the milling cutter base body 20a of the first side milling cutter 20. The side milling cutters 20 to 34 arranged on the pin-like receptacle section 12 therefore are axially clamped between the tool base body 10 and the clamping screw 16 in a non-positive manner and spaced apart by the axial distances defined by the spacer rings 35 to 49. In the cutting direction or rotating direction, the side milling cutters 20 to 34 are positively fastened on the base body 10 in a clearly defined rotational position by means of the above-described feather key 13.

In the embodiment shown, the spacer rings 35 to 49 adjust the distances between the side milling cutters 20 to 34 in such a way that the side milling cutters 20 to 34 are arranged at identical distances from one another. The distances particularly are chosen such that the multi-toothed cutting profiles of the cutting elements 20b to 34b of two successively arranged side milling cutters 20 to 34 overlap by a defined dimension in the circumferential direction or cutting direction. In other words, the microstructures produced by the cutting elements 20b to 34b of the two side milling cutters 20 to 34 overlap by the defined dimension.

In the embodiment shown, the roughening tool furthermore comprises an internal cooling lubricant supply system (which is not illustrated in the figures) in order to supply the cutting elements 20b to 34b with cooling lubricant. FIG. 1 and FIG. 3 show the outlet openings 20e to 34e of the cooling lubricant supply system, which lie in the receptacle pockets 20d to 34d and through which cooling lubricant is supplied to the cutting elements.

In the embodiment shown, the cutting section of the roughening tool formed by the side milling cutters 20 to 34 has an axial length L that is at least as long as the length of the cylindrical surface to be roughened.

According to the invention, a cylindrical surface is roughened by initially positioning the roughening tool 1 outside the cylindrical surface to be machined in such a way that the longitudinal center axis or rotational axis 2 of the roughening tool 1 is aligned with the bore axis. Subsequently, the rotating roughening tool 1 is introduced into the bore along the bore axis up to a desired axial depth and then moved radially outward until the cutting teeth 20b to 34b cut into the cylindrical surface up to a desired radial depth. The roughening tool 1 is then moved about the bore axis along a 360° orbit with the radius corresponding to the desired radial depth. After this 360° circular motion, the roughening tool is once again moved back radially inward and retracted from the bore along the bore axis.

The inventive roughening tool therefore makes it possible to simultaneously cut a plurality of circularly extending microgrooves into the cylindrical surface in one machining cycle, i.e. during a 360° circular motion. The cutting profile of each cutting element, which is defined by the cutting teeth, is adapted to the desired microstructure to be produced.

The preferred embodiment of the inventive roughening tool described with reference to the figures can also be modified, for example, as described below.

In contrast to the embodiment shown, the number of side milling cutters may be greater or smaller than fifteen. The number of side milling cutters makes it possible to adapt the length of the cutting section of the roughening tool to the length of the cylindrical surface to be roughened during a 360° circular motion.

The cutting section may be composed of side milling cutters, which are configured identically with respect to the number of cutting elements and the cutting profile of the cutting elements. In other words, the first and fifteenth side milling cutters 20, 34 of the embodiment illustrated in the figures, which differ from the second to fourteenth side milling cutter 21 to with respect to their cutting profile, are not required.

In contrast to the embodiment shown, the cutting profile width of each cutting element may correspond to or also be smaller than the width of the milling cutter base body.

For example, the cutting teeth may also have round profiles, trapezoidal profiles and/or dovetail profiles or the like, as well as any combinations of the aforementioned profiles, instead of a rectangular profile. The cutting teeth may furthermore comprise or combine symmetric and/or symmetric cross-sectional profiles.

The material of the cutting elements is not limited to a PCD material and comprises all conventional materials used in machining processes, e.g. hard metal or the like.

Furthermore, the cutting elements may also be exchangeably held on the milling cutter base body, e.g. by means of clamping or screwing. In addition, the cutting elements may be formed by cutting plates, cutting bars, cutting inserts or comparable cutting bodies and fastened on the milling cutter base body directly or indirectly, e.g. by means of a cartridge, as in the embodiment shown.

In contrast, the side milling cutters may also be realized in one piece, i.e. monolithically.

In addition, the number of cutting elements, which are arranged at identical angular distances from one another, i.e. with the same angular pitch, may also differ from the eight cutting elements provided in the embodiment shown.

In addition, the cutting teeth of each cutting element, which are arranged at an axial distance one another, may not be arranged parallel to the rotational axis, but rather offset relative to one another in the rotating direction or circumferential direction such that they effectively extend in a helical manner.

In order to be positively fastened in the rotating direction, i.e. for the torque transfer, the side milling cutters may comprise a plurality of longitudinal grooves, which respectively are open toward the inside of the inner circumference of the central recess, analogous to a splined hub. In this way, the rotational position of each side milling cutter can be flexibly changed, for example for arranging the side milling cutters in such a way that the cutting elements of the side milling cutters extend axially in rows or along helical lines or helixes, respectively. All in all, the roughening tool can therefore be realized in a linearly grooved or helically grooved manner.

Instead of using the feather key connection shown, the side milling cutters may also be positively fastened on the tool base body in the rotating direction, i.e. for the torque transfer, analogous to a splined shaft/splined hub connection or a polygonal hub/polygonal shaft connection. The side milling cutters may therefore respectively comprise a central recess with a splined hub or internal polygonal profile whereas the tool base body has a splined shaft or external polygonal profile on the receptacle section carrying the side milling cutters.

In contrast to the embodiment shown, the distance between two axially successive side milling cutters may be adjusted in such a way that the multi-toothed cutting profiles of the cutting elements of the two side milling cutters do not overlap viewed in the circumferential direction or cutting direction, but the microstructures produced by the cutting elements of the two side milling cutters rather follow one another in an axially flush manner or with a defined distance from one another.

Instead of the HSK shank section shown, the roughening tool may also comprise a SK (steep taper) shank section or the like. Furthermore, a shank section may be omitted, in which case the base body formed by the pin-like receptacle section is clamped on or clamped in differently.

The internal cooling lubricant supply system for supplying the cutting elements with cooling lubricant is not mandatory.

Figure 9:
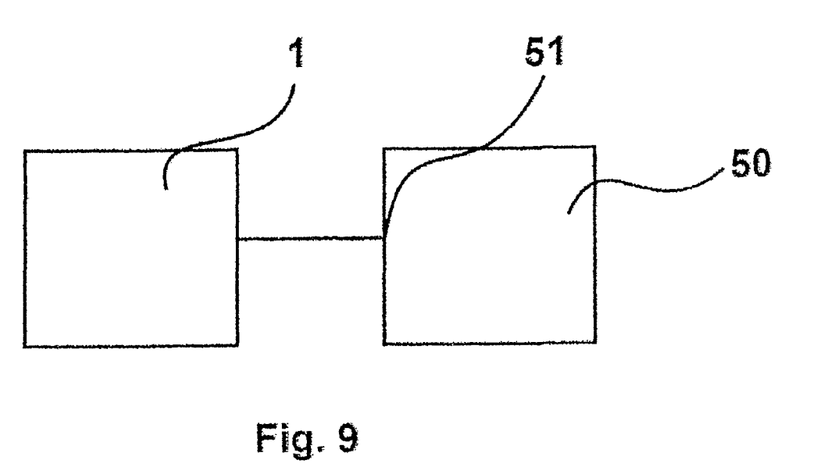
FIG. 9 schematically depicts a roughening tool connected to a disconnection point or interface of a machine tool system.

FIG. 9 schematically depicts a roughening tool 1 connected to a disconnection point or interface 51 of a machine tool system 50.

The invention claimed is:

1. A roughening tool for roughening the cylindrical surface of a bore in a workpiece, by producing a defined microstructure that is composed of a plurality of microgrooves extending circumferentially at an axial distance from one another, comprising
a tool base body, which is capable of being driven so as to rotate about a rotational axis, and
a plurality of cutting tools, comprising at least a first cutting tool and a second cutting tool, each cutting tool is a discrete disk,
each cutting tool comprising a plurality of cutting elements, each cutting element comprising a plurality of cutting teeth that are arranged at an axial distance from one another, each cutting element of the first cutting tool having an identical cutting tooth profile, each cutting element of the first cutting tool having a first cutting tooth profile, each cutting element of the second cutting tool having a second cutting tooth profile, the first cutting tooth profile is different from the second cutting tooth profile, wherein each cutting element profile is the entirety of the cutting teeth in a plan view of a rake face of a respective cutting element of the plurality of cutting elements,
each cutting tool comprising a respective central recess through which the tool base body extends, an exterior of the tool base body and the central recess of the first cutting tool are shaped such that the first cutting tool is capable of being positioned in at least first and second rotational positions relative to the tool base body, the first rotational position differing from the second rotational position, wherein:
with the first cutting tool in the first rotational position, the tool base body would not prevent the first cutting tool from being slid along the rotational axis relative to the tool base body, and the tool base body prevents the first cutting tool from rotating about the rotational axis relative to the tool base body, and
with the first cutting tool in the second rotational position, the tool base body would not prevent the first cutting tool from being slid along the rotational axis relative to the tool base body, and the tool base body prevents the first cutting tool from rotating about the rotational axis relative to the tool base body.

2. The roughening tool according to claim 1, wherein:
for each cutting tool, each of the cutting elements are arranged at identical angular distances from one another in a circumferential direction.

3. The roughening tool according to claim 1, wherein each cutting tooth of the plurality of cutting teeth has a rectangular profile, which is defined by a predetermined length and height.

4. The roughening tool according to claim 3, wherein the predetermined length lies in the range between 200 and 400 μm and the predetermined height lies in the range between 60 and 200 μm.

5. The roughening tool according to claim 1, wherein the axial distance between each pair of successive teeth lies in the range between 100 and 200 μm.

6. The roughening tool according to claim 1, wherein the cutting tools are exchangeably fastened on the tool base body.

7. The roughening tool according to claim 1, wherein the cutting tools are fastened on the tool base body in the rotating direction by means of a feather key.

8. The roughening tool according to claim 1, wherein the cutting tools are fastened on the tool base body in the axial direction by means of a clamping screw.

9. The roughening tool according to claim 1, wherein the distance between two axially successive cutting tools is defined by a spacer arranged between the cutting tools.

10. The roughening tool according to claim 1, wherein the distance between two successive cutting tools is defined in such a way that cutting profiles of the cutting elements of two cutting tools overlap by a defined dimension in a circumferential direction.

11. The roughening tool according to claim 1, wherein two axially successive cutting tools respectively are rotated relative to one another about the rotational axis in such a way that the cutting elements of the two axially successive cutting tools are arranged at a defined angular distance from one another.

12. The roughening tool according to claim 1, wherein two axially successive cutting tools respectively are rotated relative to one another about the rotational axis in such a way that the cutting elements are arranged helically.

13. The roughening tool according to claim 1, wherein the roughening tool further comprises a shank section, which forms an axial extension of the tool base body and serves for connecting the roughening tool to a machine tool system.

14. The roughening tool according to claim 1, wherein the roughening tool further comprises an internal cooling lubricant supply system for supplying the cutting elements with cooling lubricant.

15. The roughening tool according to claim 1, wherein a cutting section of the roughening tool, which is formed by the plurality of cutting tools, has a length that is greater than or equal to the length of the cylindrical surface to be machined.

16. The roughening tool according to claim 1, wherein the plurality of cutting tools includes a plurality of the first cutting tool, the plurality of the first cutting tool is axially arranged between the second cutting tool and an additional cutting tool, the second cutting tool and the additional cutting tool each have a greater profile width, measured parallel to the rotation axis, than each of the plurality of the first cutting tool.

17. The roughening tool according to claim 1, wherein the cylindrical surface is a piston bearing surface of a cylinder bore or a cylinder liner in an internal combustion engine.

18. The roughening tool according to claim 1, wherein the complementary shapes of each cutting tool and the respective exterior portion of the tool base body comprise a feather key.

19. The roughening tool according to claim 1, wherein the complementary shapes of each cutting tool and the respective exterior portion of the tool base body each comprise a polygon cross-sectional shape.

20. The roughening tool according to claim 1, wherein the complementary shapes of each cutting tool and the respective exterior portion of the tool base body comprise a splined hub in each central recess of each cutting tool, and a splined shaft on the exterior of the tool base body.

* * * * *